Dec. 1, 1936.　　J. SANDS ET AL　　2,062,764
REAR VISION MIRROR
Filed Dec. 9, 1935
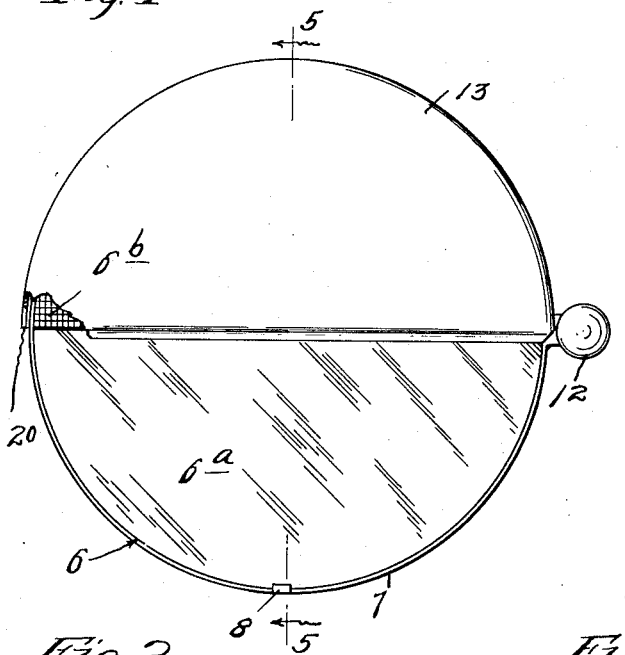
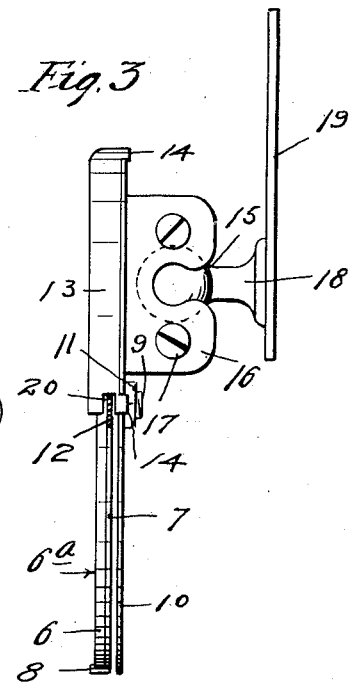
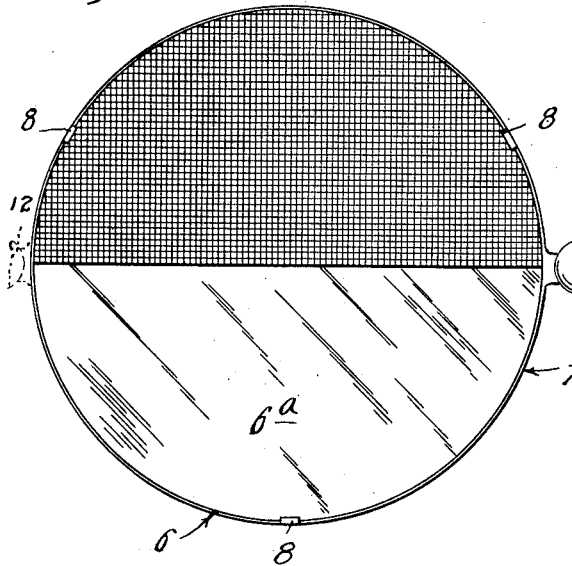
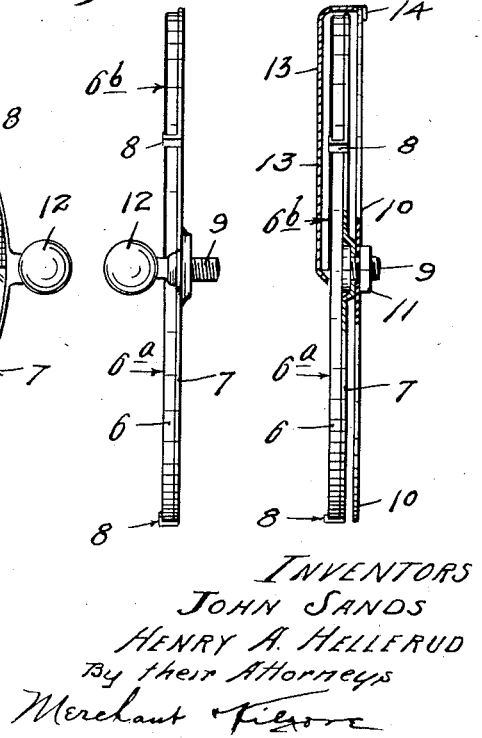
INVENTORS
JOHN SANDS
HENRY A. HELLERUD
By their Attorneys
Merchant & Figore Patented Dec. 1, 1936

2,062,764

UNITED STATES PATENT OFFICE 2,062,764

REAR VISION MIRROR

John Sands and Henry A. Hellerud, Minneapolis, Minn.

Application December 9, 1935, Serial No. 53,574

8 Claims. (Cl. 88—77)

Our invention relates generally to mirrors having movable or interchangeable reflecting surfaces varying in character, but the invention is primarily directed to the provision of an extremely simple and highly efficient rear vision mirror for automobiles or motor-propelled vehicles.

It is a well known fact that for daylight driving, the bright or ordinary mirror surface for a rear vision mirror for automobiles best serves the purpose. It is also known, however, that for night driving, the projecting rays from the headlights of trailing automobiles, striking the bright mirror surface, produce a blinding effect in the eyes of the driver.

It is further known that a mirror having a dark or substantially black reflecting surface will give the driver the proper rear vision at night, and that the light from the headlights of trailing automobiles will not produce a blinding effect when reflected from the dark mirror surface.

The above facts have been taken advantage of and incorporated in rear vision reflecting mirrors in various different ways, but our invention incorporates the features in a very simple, compact and novel arrangement whereby the interchanging of positions of the bright and dark reflecting surfaces of the mirror may be accomplished by the simplest kind of a movement. The invention further involves novel features which make the device of simple construction to make, easily installed, compact in form and neat in appearance.

A preferred form of the mirror is illustrated in the accompanying drawing, wherein like characters indicate like parts throughout the several views.

Referring to the drawing:

Fig. 1 is a front or face elevation showing the mirror and with the bright surface of the mirror exposed to view;

Fig. 2 is a view corresponding to Fig. 1, but with the semi-circular shield of the casing of the mirror removed, so that both the light and dark reflecting surfaces of the mirror are shown in full view;

Fig. 3 is a side elevation of the complete mirror and its support;

Fig. 4 is an edge elevation of the mirror proper and its back plate; and

Fig. 5 is a section taken on the line 5—5 of Fig. 1.

The mirror proper 6, that is, the part frequently designated as a looking glass, is of disc-like form and on its reflecting face is provided with a semi-circular bright reflecting surface 6a and a dark semi-circular reflecting surface 6b. This mirror 6 is provided with a thin metal back plate 7, to which it is secured by clinched or bent over lips 8 provided at the margin of the plate 7. At its axis, the plate 7 is provided with an axially projecting pivot trunnion 9 that is shown as threaded and is passed through an axial perforation of a metal plate 10 that forms the back of the fixed portion of the mirror support, and in fact, forms a part of the housing for the mirror.

A nut 11 on the rear outer end of the trunnion 9 pivotally connects the mirror back plate 7 and hence the mirror to the back plate 10 of the casing. At one point outward of its margin, the mirror plate 7 is shown as provided with a projecting knob or handle 12, by means of which it may be readily oscillated.

Approximately one-half, to wit: the upper half of the mirror is always covered from view by means of a semi-circular shield 13, which as shown, has a back-turned flange with bent ears 14 clinched against the back of the plate 10, thereby holding the plates 10 and 13 together and forming a pocket or hood within which the upper half of the mirror is always contained.

The back plate 10 is connected to a suitable support by a universal joint. As shown, this universal joint is afforded by a ball or spherical head 15 and socket-forming ears 16, which latter are adapted to be tightened onto the ball by screws or bolts 17. The ears 16 are secured to the back of the back plate 10 and the ball 15 has a neck 18 that is secured to a bracket or plate 19, which latter is adapted to be secured to the front portion of the frame of an automobile in position to properly support the mirror. By adjustments of the complete mirror on the ball and socket joint, the mirror can, by rotary or angular adjustments or both, be set so as to properly direct the line of vision through the rear window of the automobile.

By reference to Fig. 3, it will be noted that the flange of the shield 13, at its diametrically opposite ends, is notched as shown at 20 to afford clearance for the shank of the knob 12 and thereby permit the mirror to be given oscillatory movements through 180 degrees, as required to move the mirror from a position in which its entire bright surface will be exposed to view, and its dark surface covered, into a position in which its dark surface will be exposed to view and its bright surface covered, or conversely. From the foregoing, it is evident that the mirror may be converted from a day driving mirror into a night driving mirror, or conversely, simply by engaging the knob 12 and giving the mirror a quick half rotation. Also it is evident that the device is of simple construction and neat or ornamental appearance. The device, of course, is capable of modification as to its detail of construction within the scope of the invention and may be put to various different uses where a mirror or reflector of the above character may be found serviceable or desirable.

What we claim is:

1. In a device of the kind described, a support, a shield and a mirror mounted on said support, one thereof being mounted for oscillatory movements in respect to the other, said shield being located in front of said mirror, said mirror on one face having relatively bright and dark reflecting surfaces, said shield being arranged to cover one of said reflecting surfaces and to expose the other, said movable element being movable in its own plane 2. The structure defined in claim 1 in which said shield covers approximately one-half of said mirror, and said mirror is the movable element and the relatively bright and dark reflecting surfaces each cover approximately one-half of the front face of the mirror.

3. In a device of the kind described a back member provided with a shield, a mirror rotatively mounted on the back member behind said shield for movement in its own plane, said shield covering approximately one-half of said mirror, said mirror having a relatively bright reflecting surface covering approximately one-half of the front face thereof and having a relatively dark reflecting surface covering approximately the other half of said face.

4. The structure defined in claim 3 in which said mirror has a metallic carrying plate with marginal lips bent over the marginal portion of the mirror to hold the latter on said metallic plate.

5. In a device of the kind described a back member and a mirror mounted on said back member for rotary movement in its own plane, said mirror on its front face having relatively bright and dark reflecting surfaces, said back member having a hood covering approximately one-half of the front face of said mirror, the other half of the front face of said mirror being exposed to view, said mirror being of disc-like form, said relatively bright reflecting surface covering approximately one-half of the front face of said mirror and said relatively dark reflecting surface covering the other half of the front face of the said mirror.

6. The structure defined in claim 5 in which said mirror has a finger projecting therefrom approximately between the bright and dark surfaces thereof and engageable with said hood to limit the rotary movements of said mirror.

7. In a device of the kind described a mirror having relatively bright and dark reflecting surfaces each covering approximately one-half of the front face thereof, a support for said mirror provided with a shield constructed and arranged to cover at one time either one of said reflecting surfaces while exposing the other to view, said mirror being mounted on said support for rotation in its own plane on an axis perpendicular to the plane of said reflecting surfaces.

8. In a device of the kind described, a mirror structure having relatively bright and dark reflecting surfaces on the same face thereof, and a cover adapted to cover, at one time, one of said reflecting surfaces, one of said members being movable to selectively expose to view one of said reflecting surfaces and a support for said mirror and cover holding the same in co-operative relation and mounting the movable member for movement in its own plane on an axis perpendicular to the reflecting face of said mirror.

JOHN SANDS.
HENRY A. HELLERUD.